United States Patent [19]

Tsukagoshi

[11] Patent Number: 5,731,847
[45] Date of Patent: Mar. 24, 1998

[54] SUBTITLE ENCODING/DECODING METHOD AND APPARATUS

[75] Inventor: Ikuo Tsukagoshi, Tokyo, Japan

[73] Assignee: Sony Corporation, Tokyo, Japan

[21] Appl. No.: 618,515

[22] Filed: Mar. 19, 1996

[30] Foreign Application Priority Data

Mar. 20, 1995 [JP] Japan .................................. 7-085956
Oct. 20, 1995 [JP] Japan .................................. 7-295990

[51] Int. Cl.$^6$ .............................. H04N 5/278; H04N 9/74
[52] U.S. Cl. ...................... 348/589; 348/600; 348/599; 348/569
[58] Field of Search .................................. 348/468, 472, 348/473, 563, 564, 569, 589, 600, 599; H04N 5/278, 9/74

[56] References Cited

U.S. PATENT DOCUMENTS 5,065,143  11/1991  Greaves .................................. 348/599

*Primary Examiner*—Sherrie Hsia
*Attorney, Agent, or Firm*—William S. Frommer; Alvin Sinderbrand

[57] ABSTRACT

Encoding and decoding of subtitle data is performed in real time. A buffer regulates a flow rate of the subtitle data to ensure that the appropriate subtitles are superimposed with the correct video picture. In encoding, subtitles are generated in correspondence to a video picture. The subtitles are separately encoded and multiplexed with the video picture for transmission. Upon decoding, the subtitles are selected at a time which corresponds to the display of the corresponding video picture. Since the subtitles are processed separately from the video data, the subtitles may be manipulated with great control; thus providing more flexibility in encoding and decoding.

41 Claims, 15 Drawing Sheets

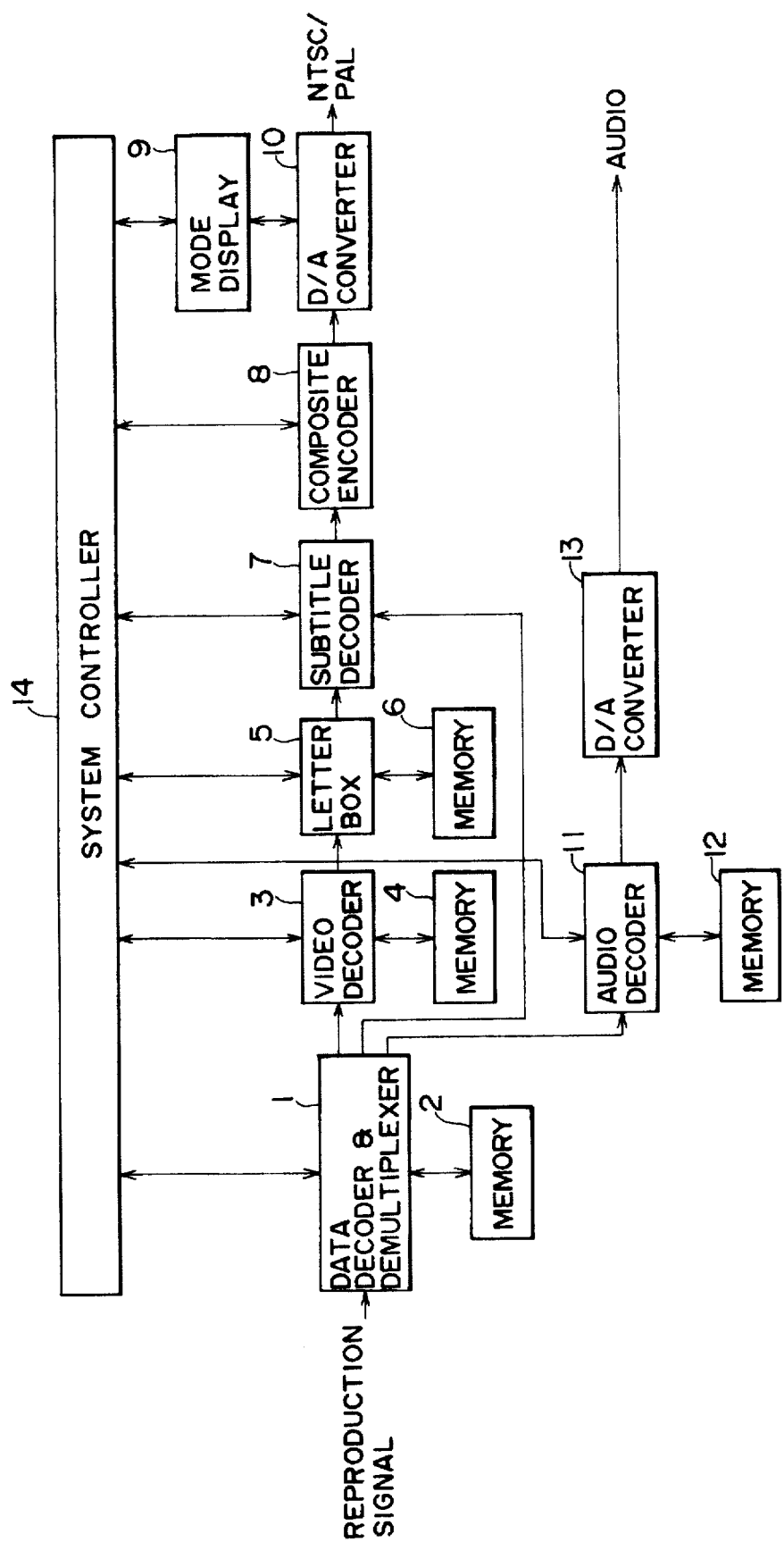

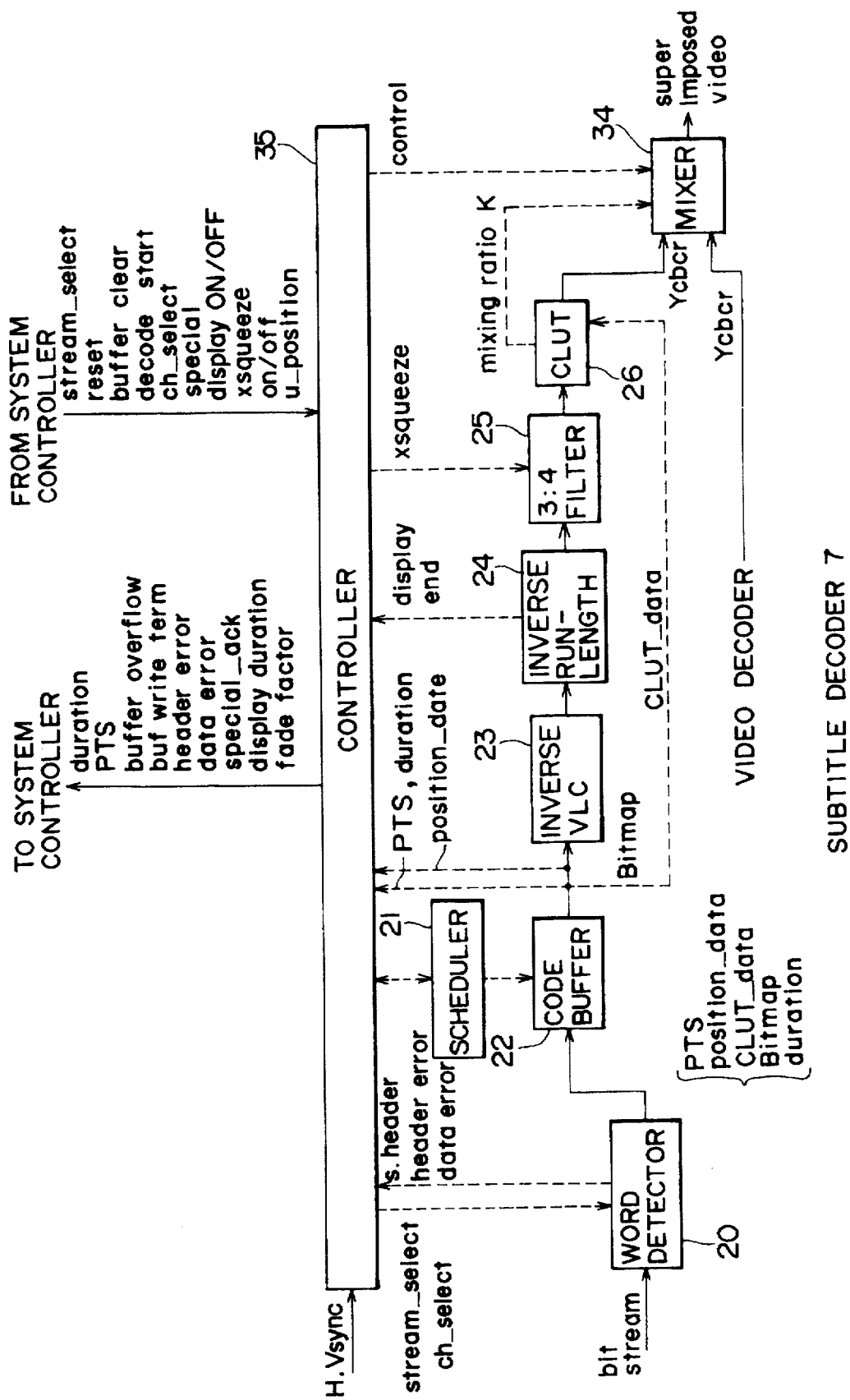

FIG. 3

(1) FROM SYSTEM CONTROLLER 14

| name | bits | description | rate |
|---|---|---|---|
| reset | 1 | SYSTEM RESET | |
| buffer clear | 1 | INSTRUCTION FROM SYSTEM CONTROLLER TO CANCEL CODE DATA, CONTAINING ERROR | |
| decode start | 1 | START OF DECODING (START READING FOR CODE BUFFER) | max30Hz |
| stream_select | 5 | STREAM DESIGNATION INCLUDING IDENTIFICATION FOR USUAL REPRODUCTION/SPECIAL REPRODUCTION, ETC. | max30Hz |
| ch_select | 5 | DECODE CHANNEL DESIGNATION | static |
| special | 1 | SPECIAL REPRODUCTION | static |
| repeat time | 8 | DISPLAY TIME FOR SPECIAL REPRODUCTION | as it happens |
| xsqueeze | 1 | USING 16:9 MONITOR | as it happens |
| display on/off | 1 | SUBTITLE SUPER ON/OFF | static |
| u_position | 8 | USER DESIGNATED DISPLAY POSITION (VERTICAL DIRECTION OF SCREEN) | static |

(2) TO SYSTEM CONTROLLER 14

| name | bits | description | rate |
|---|---|---|---|
| PTSS | 33 | TIME STAMP FOR SUBTITLE DISPLAY TIME | max30Hz |
| buffer overflow | 1 | TWO BANKS OF DATA PRESENT IN BUFFER | max30Hz |
| buf write term | 1 | WRITING FOR ONE BANK OF DATA TERMINATED | max30Hz |
| header error | 1 | HEADER ERROR | max30Hz |
| data error | 1 | DATA ERROR | max30Hz |
| special_ack | 1 | ACK OF SPECIAL REPRODUCTION | as it happens |
| rperat | 8 | DISPLAY TIME (BOTH USUAL AND SPECIAL) | max30Hz |
| v.position | 8 | DISPLAY POSITION UPON ENCODING | max30Hz |
| fade factor | 4 | FADE IN/OUT TIME | |

FIG. 4

```
(1) (2) : 8bit bus+4bit select+1bit I/O
others: real signal bits
```

(3) from generator        bits

H sync             1

V sync             1

13.5Mbz clock     1

(4) from demux data stream       8 strobe             1 eror               1

(5) to code buffer address           15 data               8 xce                1 xwe                1 xoe                1

(6) from video decoder video data(4:2:2)    16

(7) to DAC video data(4:2:2)    16

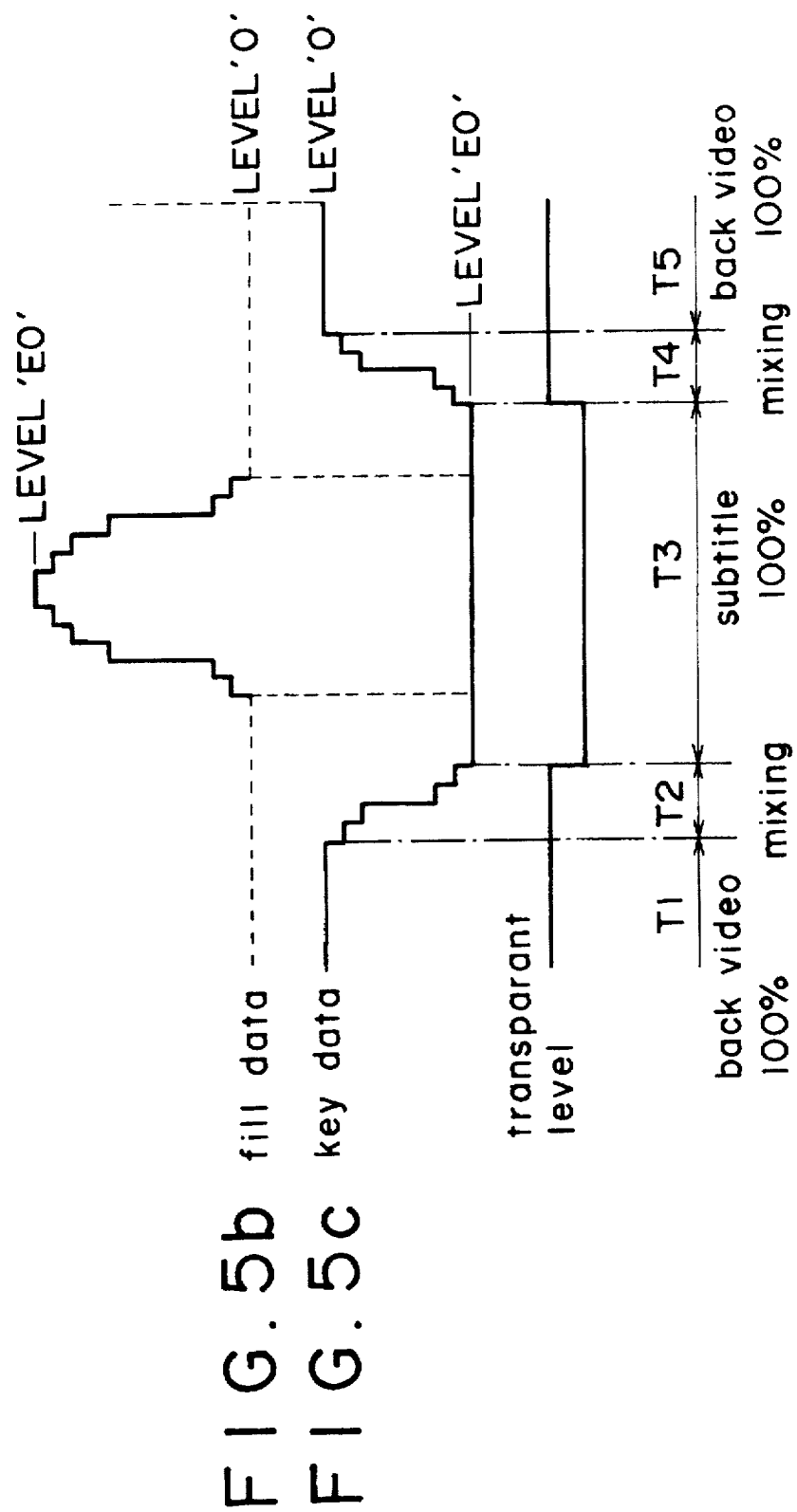
FIG. 5a
FIG. 5b fill data
FIG. 5c key data

FIG. 6

| Addr | Y  | Cr | Cb | K   |
|------|----|----|----|-----|
| 0    | 00 | 7F | 7F | 00  |
| 1    | 00 | 7F | 7F | 20  |
| 2    | 00 | 7F | 7F | 40  |
| ⋮    |    |    |    |     |
| 6    | 00 | 7F | 7F | C0  |
| 7    | 00 | 7F | 7F | E0* |
| 8    | 00 | 7F | 7F | E0  |
| 9    | 20 | 7F | 7F | E0  |
| ⋮    |    |    |    |     |
| E    | C0 | 7F | 7F | E0  |
| F    | E0 | 7F | 7F | E0  |

\* E0 : SUBTITLE DATA 100%
: VIDEO DATA 0%

FIG. 7A
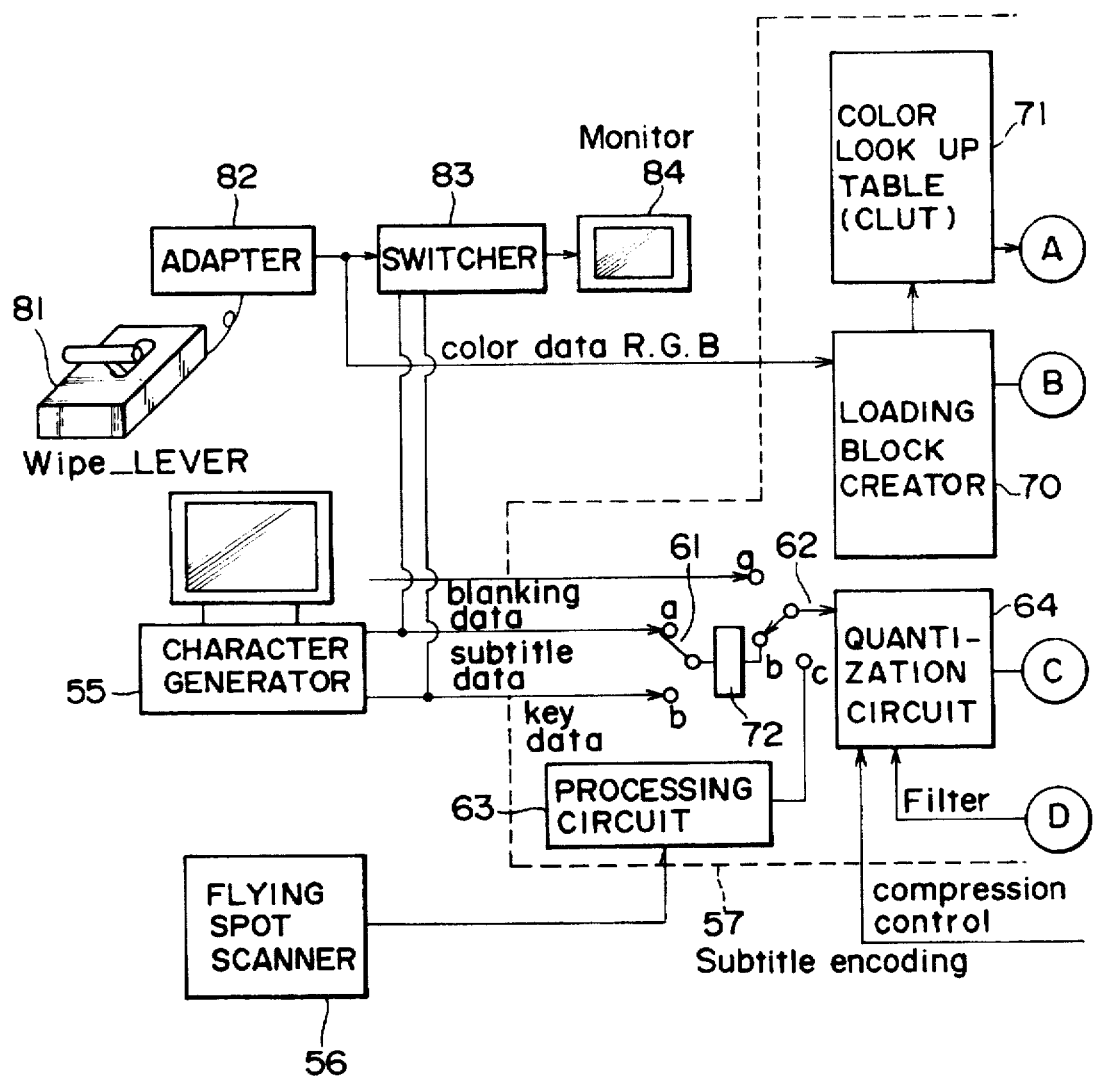
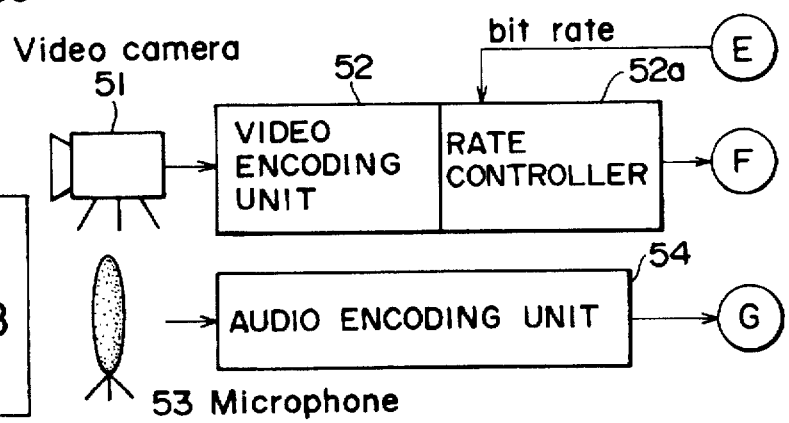
FIG. 7
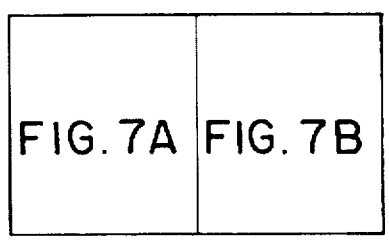

Subtitle decoder buffer model

FIG. 12

Color Lookup table

| Addr | Y  | Cr | Cb | K  |
|------|----|----|----|----|
| 0    | 00 | 7F | 7F | 00 |
| 1    | 20 | 7F | 7F | 40 |
| 2    | 40 | 7F | 7F | 80 |
| 3    | 60 | 7F | 7F | C0 |
| 4    | 80 | 7F | 7F | F0 |
| 5    | A0 | 7F | 7F | F0 |
| 6    | C0 | 7F | 7F | F0 |
| 7    | E0 | 7F | 7F | F0 |
| 8    | 00 | FF | FF | 00 |
| 9    | 20 | FF | FF | 40 |
| A    | 40 | FF | FF | 80 |
| B    | 60 | FF | FF | C0 |
| C    | 80 | FF | FF | F0 |
| D    | A0 | FF | FF | F0 |
| E    | C0 | FF | FF | F0 |
| F    | E0 | FF | FF | F0 |

1Block → 75Hz

1Frame → 75 x 98Hz subcode bit rate = 7.35kBytes/s

TRANSMISSION FORMAT

SUBTITLE ENCODING/DECODING METHOD AND APPARATUS

BACKGROUND OF THE INVENTION

The present invention relates to encoding and decoding video data and, more particularly, to encoding and decoding subtitles superimposed on a video display screen.

In video broadcasting, subtitles are employed to convey textual information to the viewer. The subtitles accompany an audio/video broadcast and provide supplemental information to the viewer that may not be perceivable from the broadcast. Subtitles are frequently used, for example, to aid hearing impaired viewers by displaying the spoken language recorded in the audio soundtrack as written language. Another example, is where subtitles are displayed in different languages than the spoken language recorded in the audio soundtrack. In addition, subtitles may be employed to convey important information not related to the subject matter of the corresponding audio/video broadcast. In this case, subtitles may represent late-breaking news, such as: emergency information; sports scores; weather reports; and other important information.

In television broadcasting or video reproduction (such as from a video disk), the subtitles are previously superimposed on the broadcast and become an inseparable part of the video picture. In this situation, a viewer does not have control to turn the subtitles on or off. This is disadvantageous where a viewer desires to video record the broadcast without the subtitles. For example, the viewer may be recording a televised movie and, suddenly, news subtitles are superimposed on the broadcast thereby ruining the recording.

Previously superimposed subtitles are also undesirable because a plurality of languages cannot be selected. Where a viewer does not comprehend the subtitle language the subtitles are annoying surplusage. On the other hand, where the viewer further does not comprehend the spoken language, the broadcast is incomprehensible to the viewer.

Compact Disc Graphics (CD-G) provide more flexibility in displaying subtitles because this technique records graphics on a compact disc (CD) by using subcodes. However, CD-G has a serious disadvantage because this technique is limited to CD applications. The CD-G technique does not lend itself to other recording formats and, thus, to the vast majority of audio/video broadcasts which employ such other recording formats, such as video tape.

FIGS. 13a–c and 14 demonstrate that the CD-G technique is not suitable for use with broadcasting subtitles during real-time broadcasts. In particular, an analysis of the data format employed by CD-G reveals that this technique requires a transmission lead-time of several seconds (10.24 s) which generally is unacceptable for most real-time broadcasts.

FIG. 13a depicts the CD-G data format in which one frame includes 1 byte of a subcode and 32 bytes of audio channel data. Of the 32 bytes, 24 bytes are allocated for L and R audio channel data (each channel having 6 samples with 2 bytes per sample) and 8 bytes are allocated to an error correction code. The frames are grouped as a block of 98 frames (Frame 0, Frame 1, . . . , Frame 96 and Frame 97) as shown in FIG. 13b. Eight blocks P,Q,R,S,T,U,V and W are transmitted as shown in FIG. 13c. The subcodes for Frames 0 and 1 in each block are defined as sync patterns S0, S1, whereas the remaining 96 frames store various subcode data. Among a group of 8 blocks, the first 2 blocks P, Q are allocated to search data employed for searching through record tracks; and graphic data can be allocated to the subcodes in the remaining 6 blocks R,S,T,U,V and W.

Since each block of 98 frames is transmitted at a repeating frequency of 75 Hz, the data transmission rate for 1 block is (75×98 bytes) 7.35 kHz, or 7.35K bytes/s. The transmission format for transmitting the information present in blocks R,S,T,U,V and W is shown in FIG. 14. Each of the 96 frames (2, 3, . . . 97) of the 6 blocks (R,S,T,U,V and W) 96 is arranged as a packet including 6 channels (R to W) of 96 symbols per channel. The packet is further subdivided into 4 packs of 24 symbols each (symbol 0 to symbol 23), with each symbol representing a frame.

A CD-G character is made up of 6×12 pixels. Since each pack is 6×24, a 6×12 character is easily accommodated in each pack. The CD-G format allocates the six channels of (R,S,T,U,V and W) and the 12 symbols 8 to 19 to a character. The remainder of the symbols in each of the packs store information about the character.

Mode information is stored in the first 3 channels (R, S, T) of symbol 0 in each pack, and item information is stored in the last 3 channels (U, V, W) of symbol 0. A combination of the mode information and the item information defines the mode for the characters stored in the corresponding pack as follows:

TABLE 1

| Mode | Item | |
|------|------|------|
| 000 | 000 | mode |
| 001 | 000 | graphics mode |
| 001 | 001 | TV-graphics mode |
| 111 | 000 | user's mode |

An instruction is stored in all of the channels of symbol 1. Corresponding mode, item, parity or additional information for the instruction is stored in all of the channels of symbols 2 to 7. Parity for all of the data in the channels of symbols 0 to 19 is stored in all of the channels of the last 4 symbols (symbols 20 to 23) of each pack.

As discussed, the data is transmitted at a repeating frequency of 75 Hz. Therefore, a packet which contains 4 packs is transmitted at a rate of 300 packs per second (75 Hz×4 packs). That is, with 1 character allocated to the range of 6×12 pixels, 300 characters can be transmitted in 1 second.

However, a CD-G screen requires more than 300 characters. A CD-G screen is defined as 288 horizontal picture elements×192 vertical picture elements and requires more than twice the 300 characters transmitted in 1 second. The total transmission time for a 288×192 screen is, therefore, 2.56 seconds as shown by the following equation:

$$(288/6) \times (192/12) + 300 = 2.56 \text{ seconds}$$

This is extremely long to regenerate each screen when it is considered that screens are usually refreshed every 0.6 seconds. This problem is compounded when hexadecimal codes are used for the characters because each hexadecimal expression requires 4 bits to represent 1 pixel. As a result, 4 times the data described above is transmitted increasing the transmission rate to 10.24 seconds (4×2.56 seconds). Since each screen requires a sluggish 10.24 seconds for transmission, a continual transmission of screens means that a lag time of 10.24 seconds is experienced when transmitting screens using the CD-G technique. Thus, the CD-G technique is not performed in real time and is unacceptably slow for use in a real time broadcast.

The CD-G system also suffers from defects in reproducing the subtitles. The CD-G system displays subtitles only upon normal reproduction and not during special reproduction such as a fast forward or fast reverse reproduction. CD-G pictures are also subject to sing phenomena (in which oblique portions of a character are ragged) or flickering because this system allocates only one bit of data for each picture element. The lag time of the CD-G picture also prevents switching the subtitle display on or off at a high speed.

In one type of system (known as the CAPTAIN system), dot patterns, as well as character codes, represent the subtitles. This system, however, does not appear to be any better than the CD-G system and suffers from some of the same disadvantages. In both systems, for example, the subtitles lack refinement because these systems do not provide sufficient resolution power in displaying the subtitles. The CAPTAIN system, for example, is developed for a 248 (horizontal picture elements) by 192 (vertical picture elements) display and not for high resolution video pictures of 720×480.

OBJECTS OF THE INVENTION

An object of the invention, therefore, is to provide an encoding/decoding method and apparatus for encoding and decoding subtitles with a greater degree of flexibility.

A further object of the invention is to encode the subtitles separately from the video data so that the subtitles may be independently manipulated.

A further object of the invention is to decode the subtitles in real time so that the subtitles may be contemporaneously superimposed with a video picture.

An even further object of the invention is to provide a processor for controlling the encoding/decoding of the subtitles for controlling a flow rate of subtitle data read out from a buffer such that the subtitle data is contemporaneously combined with corresponding video data.

SUMMARY OF THE INVENTION

The encoding apparatus of the present invention provides a subtitle generator for generating the subtitles for display with a respective video picture. The subtitles are encoded into encoded subtitle data and the flow rate of the data is regulated by a buffer to be contemporaneous with the respective video picture encoded by a video encoder.

In the decoding apparatus of the present invention a buffer regulates the flow rate, i.e. the rate at which bits are read from the buffer, of the encoded subtitle data to contemporaneously combine the encoded subtitle data with a respective video picture decoded by a video decoder. The encoded subtitle data is decoded into decoded subtitle data and a mixer superimposes the decoded subtitle data and the respective video picture.

The invention also provides a processor for controlling the encoding/decoding. A respective one of several bit streams of subtitle data is selectively buffered; and a time display stamp indicates the time when the respective bit stream is to be decoded. Decoding of the respective bit stream is initiated during the time indicated by the time display stamp. A mixer mixes the respective decoded bit stream with video picture data.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 1 is a block diagram of a data decoding apparatus of the present invention;

FIG. 2 is a block diagram of the subtitle decoder depicted in FIG. 1;

FIG. 3 is a table of communications between the system controller of FIG. 1 and the controller of FIG. 2;

FIG. 4 is a table of parameters for the communications between components of FIG. 1 and FIG. 2;

FIGS. 5a to 5c are signal diagrams demonstrating data encoding of the present invention;

FIG. 6 is a color look up table referred to when encoding subtitle data;

FIGS. 7, 7a and 7b constitute a block diagram of the encoding apparatus of the present invention;

FIG. 12 is a color look up table referred to when conducting a color wipe operation;

DETAILED DESCRIPTION OF THE PREFERRED EMBODIMENTS

Figure 7B:
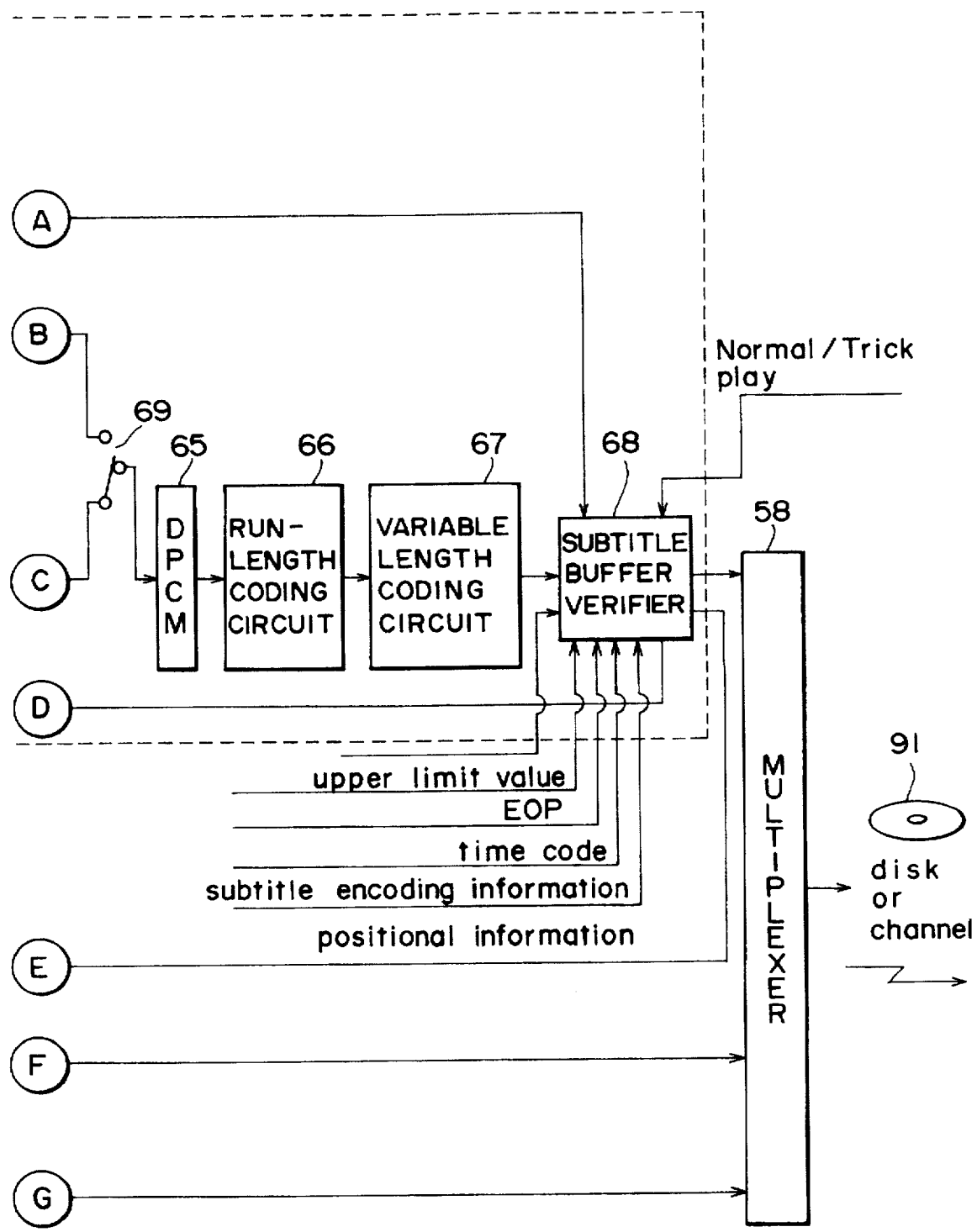

Referring now to the drawings, wherein like reference numerals designate identical or corresponding parts throughout, the present invention will be described.

Decoding Apparatus

The data decoding apparatus which incorporates the present invention is shown in FIG. 1 and decodes a reproduction signal to generate a video picture superimposed with subtitles. The system controller 14 of the data decoding apparatus causes the reproduction signal to be processed and sent to a subtitle decoder 7. The system controller communicates with the controller 35 (FIG. 2) of the subtitle decoder to decode the subtitles and combine the decoded subtitles with decoded video data. The combined subtitle and video data are, then, prepared for display on a television screen.

A data decoder and demultiplexer 1 receives a digital reproduction signal from, for example, a VCR. The data decoder and demultiplexer 1 error decodes the reproduction signal preferably employing an Error Correcting Code (ECC) technique and demultiplexes the error decoded reproduction signal into video, subtitle and audio data. A memory 2 may be used, for example, as a buffer memory and a work area for the purpose of error decoding and demultiplexing the reproduction signal.

A video decoder 3 decodes the demultiplexed video data from a video data stream. A memory 4 may be employed for the operation of decoding the video data similar to the operation of the memory 2 employed with data decoder and demultiplexer 1.

A letter box circuit 5 converts a video picture with a 4:3 aspect ratio (a squeeze mode) to a 16:9 letter box ratio. The conversion is performed using a 4 to 3 decimation process, whereby every four horizontal lines are decimated to three horizontal lines, thus squeezing the video picture into a ¾ picture. According to the letter box format, a vertical resolution component is derived from the remaining ¼ of the video picture which is employed to enhance the vertical resolution of the decimated video picture. A timing control memory 6 ensures that the ¼ of the letter box picture is not transmitted. When the decoded video data generated by the video decoder 3 is already in a 16:9 letter box format, the letter box circuit bypasses the decimation operation and sends the decoded video data directly to the subtitle decoder 7.

Meanwhile, the decoded subtitle data demultiplexed by the data decoder and demultiplexer 1 is directly sent to the subtitle decoder 7. The subtitle decoder 7 decodes the subtitle data according to instructions from the system controller 14 and mixes the decoded subtitle data with the decoded video data.

A composite encoder 8 encodes the mixed subtitle data and video data into a suitable video picture format, such as NTSC/PAL. A mode display 9 interfaces with a user and indicates, for example, the mode of television monitor connected thereto. A D/A converter 10 converts the encoded signal received from the composite encoder 8 into an analog signal suitable for display in the indicated mode, such as NTSC or PAL.

The audio portion of the audio/video signal decoded by the data decoder and demultiplexer 1 is decoded by an audio decoder 11 which decodes the demultiplexed audio data using a memory 12, for example. The decoded audio data output from the audio decoder is converted into an analog audio signal appropriate for broadcast through a television monitor by a D/A converter 13.

Subtitle Decoder

The subtitle decoder 7 of FIG. 1 communicates with the system controller 14 through a controller 35 as shown in FIG. 2. This communication controls the subtitle decoding performed by the subtitle decoder. Definitions of the communication signals between the system controller 14 and the controller 35 will be discussed with reference to FIG. 3.

The system controller 14 sends a reset command to the controller 35 to reset the subtitle decoder 7 and sends command signals indicating an operation mode of the subtitle decoder to initialize it. A special command is sent to the controller 35, for example, when a user indicates through the mode display 9 (FIG. 1) that special reproduction, such as a fast-forward or fast-reverse reproduction, is to be commenced. The user may also turn the subtitles on or off through the mode display, causing the system controller to issue a display ON/OFF command to the subtitle decoder. The user may also control the subtitle display position in the vertical direction relative to the video picture on the television monitor, causing the system controller to issue an U_position value to the subtitle decoder. With these initial parameters defined for the subtitle decoder, a decoding operation now will be described.

The subtitle data is grouped into streams of data comprising bits. Each bit stream corresponds to a portion of a page making up the entire subtitle picture for one picture frame. As shown in FIG. 2, the bit streams are applied to a word detector 20. Since the word detector selects which bits to forward to the code buffer 22, different types of bit streams may be applied to the word detector contemporaneously. In the preferred invention, for example, bit streams of both a normal playback mode and a fast-forward, or a fast-reverse, mode (special reproduction) are applied to the word detector.

Indeed, several broadcasts of video pictures can be applied to the word detector simultaneously. To that end, different channels are provided for different video pictures. The word detector 20 selects the channel indicated by a channel_select signal sent from the system controller 14 and receives the appropriate bit streams.

The system controller 14 also issues a stream_select signal to instruct the word detector 20 to select either the normal playback mode bit streams or the special reproduction mode bit streams. Thus, a viewer can switch between a normal playback mode and a special reproduction mode without delay.

The word detector 20 is also responsible for detecting both header and header_error information received in the selected bit streams. The header and header_error information are sent as information signals, S, header and header error, to the system controller 14 (via the controller 35) for further processing. Similarly, error data representing a detected error is sent as a data error signal to the system controller 14 when the word detector detects errors in the bit stream subtitle data. If the data cannot be restored, a buffer clear signal is sent from the system controller to the controller and the erroneous subtitle data is dumped.

A scheduler 21 is provided to ensure that the data received from the demultiplexer 1 (FIG. 1) does not overflow the code buffer 22. The scheduler controls read/write access to the code buffer by determining a bandwidth for an I/O port (not shown) which receives the bit streams selected by the word detector. The bandwidth refers to the number of parallel bits supplied to the I/O port at one time and is calculated by dividing the rate at which the demultiplexer demultiplexes data by the rate at which data is read from the code buffer. For example, a data rate from the demultiplexer of 20 Mbps divided by a 2.5 Mbps rate of data read from the code buffer is equal to 8 bits. Therefore, the scheduler will set the I/O port to receive 8 bits in parallel in order to maintain a consistent flow rate of data into and out of the code buffer.

A read operation is commenced in real time and is triggered when the code buffer receives a decode start command from the system controller 14. The timing for the reading is determined from horizontal and vertical sync signals stored in the headers of the subtitle data detected by the word detector 20. For real time display, the reading rate should correspond to a picture element sampling rate, preferably 13.5 MHz. As discussed, the subtitle data preferably is written into the code buffer at a rate of 2.5 MHz or more. Thus, the 13.5 MHz sampling clock is divided into four clock cycles of 3.375 MHz each. One of these 3.375 MHz clock cycles is allocated to writing (because writing requires at least 2.5 MHz) and the remaining three clock cycles are allocated to reading data from the code buffer thus satisfying the requirement for real time display.

The read/write operation described is performed in real time and provides high resolution. Eight bit of the subtitle data are read from the code buffer 22 for each of three clock cycles, or twenty-four bits per sampling clock. When display of the picture is conducted by the television monitor every fourth clock cycle, one-fourth of the twenty-four bits, (24/4=) 6 bits are displayed at every clock cycle. That is, each subtitle picture element may comprise six bits, which is more than sufficient to achieve a high quality of resolution for the subtitles.

A duration signal and a PTS signal are retrieved by the controller 35 when it is deemed that data will be read from the code buffer. The duration signal indicates the duration that the subtitle data lasts and the PTS signal indicates the proper time that the subtitle data is to be superimposed with the video data. The controller times the display of the subtitles using an internal system clock reference (SCR). When the subtitles are to be displayed, the system controller 14 sends the display ON command to the controller 35. The system controller sends the display OFF signal as a subtitle decode termination signal to the controller 35 upon termination of the subtitle display.

The system controller may also initiate a special reproduction operation in the subtitle decoder by sending a special command to the controller 35. The controller sends back an acknowledge signal (special_ack), acknowledging that special reproduction is to be initiated. To perform a special reproduction operation, the word detector must select bit streams at a special reproduction rate. Moreover, the code buffer will read out bit streams at a special reproduction rate. To uniformly speed up (or slow down) the operations of the subtitle decoder according to the special reproduction rate, the system clock reference (SCR) can be altered by adding or subtracting clock pulses. Subtraction pulses are created at an n times rate corresponding to the rate of fast-feeding or fast-reverse feeding. At the actual time when special reproduction is commenced, real time subtraction is performed on the bit stream of subtitle data read out from the code buffer at the n times rate. The special reproduction operation may also correspond to a pause operation, wherein no subtraction pulses are created; and instead, an identical frame is continuously read from the code buffer repeatedly.

Decoding of the subtitles also ends when the subtitle decoder 7 determines that an end of page (EOP) of the video picture is reached. In the preferred embodiment, the system controller 14 sends a repeat time signal to the controller 35 which indicates the length of a page. A run-length circuit 24 includes a counter and sends a display end signal to the controller 35 when the count value of the counter reaches the value indicated by the repeat time signal. The controller 35 thus determines that the repeat time is reached and stops reading from the code buffer. For purposes of this invention, the code buffer preferably stores two pages of subtitle data because one page will be read as another page is written into the code buffer.

The controller 35 issues a buffer overflow signal to the system controller 14 when an overflow of the code buffer occurs. An overflow can be determined when the controller receives the display end signal from the run-length circuit 24 before the word detector 20 receives an end of page (EOP) signal on the following page. At that time, the system controller 14 withholds transfer of subtitle data from the data decoder and demultiplexer 1 (FIG. 1) to the word detector to prevent an overflow of the code buffer. The stream_select signal from the system controller 14 designates the streams of subtitle data and the display start position is updated on every frame. Thus, after an overflow condition has passed, the next stream will be written into the code buffer and displayed at the correct display start position.

Figure 8:
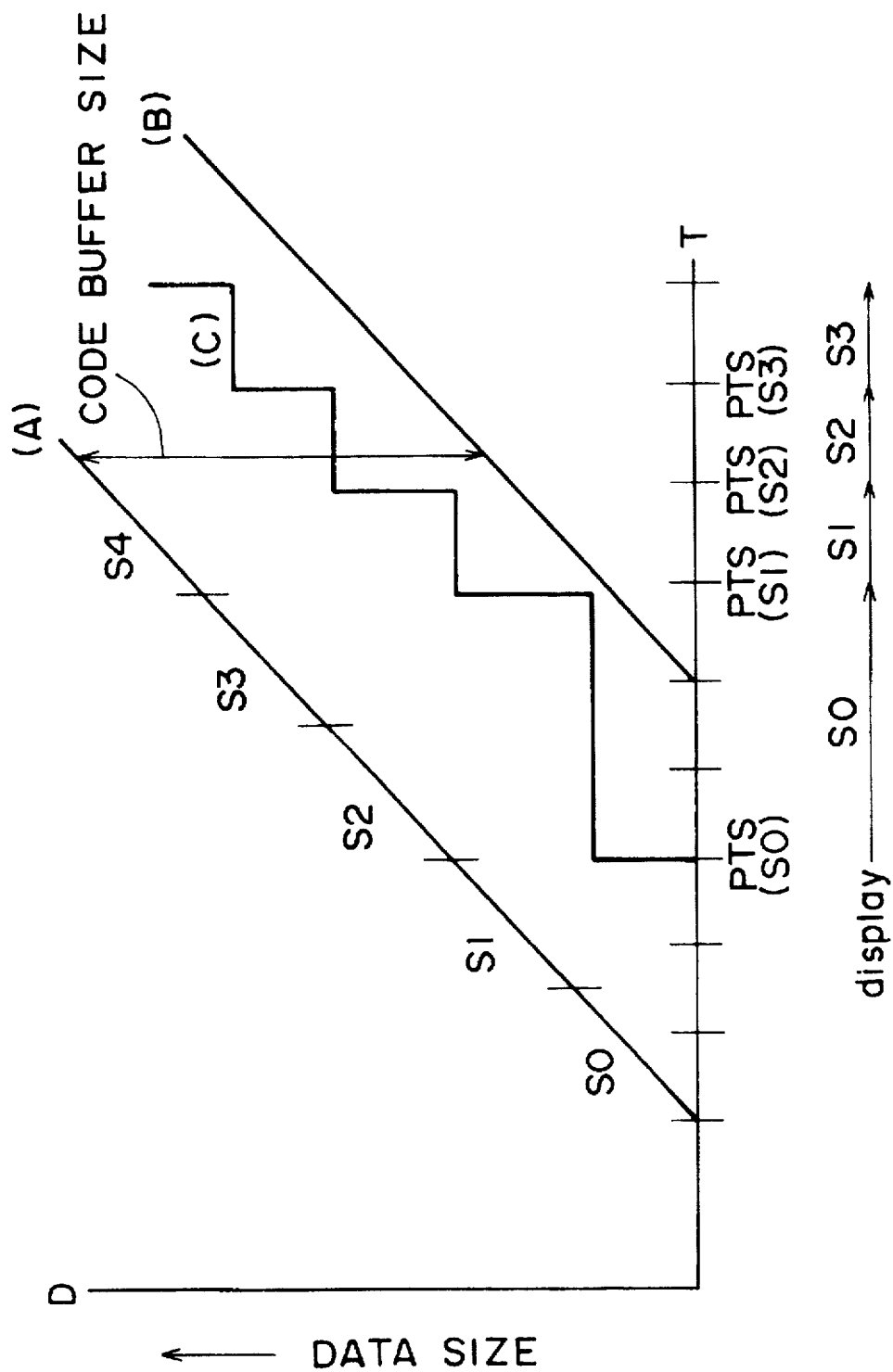
FIG. 8 is a graph for the explanation of a code buffer operation.

FIG. 8 graphically demonstrates the data flow into and out of the code buffer 22. The t-axis (abscissa) represents time, while the D-axis (ordinate) represents a data size for each page of data. Thus, the gradient (rise/run) represents the data flow rate of the subtitles into the code buffer. Graph (C) represents the data flow of the subtitle data. The vertical portions of graph (C) indicate a transfer of subtitle data from the code buffer when the display time stamp (PTS) is aligned with the synchronizing clock (SCR) generated internally by the subtitle decoder 7. The horizontal portions of the graph (C) indicate the transfer of subtitle data into the code buffer. For example, at a time that the display time stamp (PTS) for page (S0) is received by the code buffer, the previous page of subtitle data is transferred from the code buffer and page (SO) is written into the code buffer. When another display time stamp (PTS) is received by the code buffer, the subtitle data of page (SO) is transferred out of the code buffer and page (S1) is written in. Similarly, the remaining pages (S2), (S3) are written into and read out of the code buffer as indicated.

An underflow condition exists when the code buffer has completed reading the subtitle data for an entire page and no further data exists in the code buffer. A code buffer with a capacity of two pages is depicted by the "code buffer size" line in the FIG. 8. Graphically, an underflow would appear in FIG. 8 as one of the vertical portions of line (C) which extends below the lower limit of the code buffer. By contrast, an overflow condition is graphically depicted in FIG. 8 when the subtitle data read into the code buffer is too large, i.e., the horizontal portion of line (C) extends beyond line (B). The code buffer must also perform delay compensation, especially where an external memory is employed, for decoding the video data. The delay compensation is achieved by controlling the timing of the decode start command from the system controller 14. When the controller 35 of the subtitle decoder 7 sends the display time stamp (PTS) to the system controller upon writing the subtitle data to the code buffer 22, the system controller, in response, sends the decode start instruction to the controller 35. The system controller 14 delays the decode start command by a time equal to the processing of a letter box picture (approximately one field) and a delay caused by video decoding at the instant the synchronizing clock of the controller (SCR) is aligned with the display time stamp (PTS). Delay compensation is particularly useful, since the video, audio and subtitle data are multiplexed on the premise that the decode delay in each of the video, audio and subtitle data signals is zero in the data encoding apparatus.

Once the subtitle data is read from the code buffer 22, an inverse VLC (Variable Length Coding) circuit 23 (FIG. 2) subjects the subtitle data to variable length decoding. The variable length decoded subtitle data is composed of level data and run data as paired data. In the case were variable length decoding is not employed, the inverse VLC circuit may be bypassed and the subtitle data read from the code buffer will be directly output to the inverse run-length circuit 24.

The inverse run-length circuit 24 conducts run-length decoding by generating the level of data from the number of run data elements. Thus, the VLC circuit 23 and the run-length circuit 24 decompress the subtitle data which had been stored as compressed data in the code buffer 22.

Figure 11:
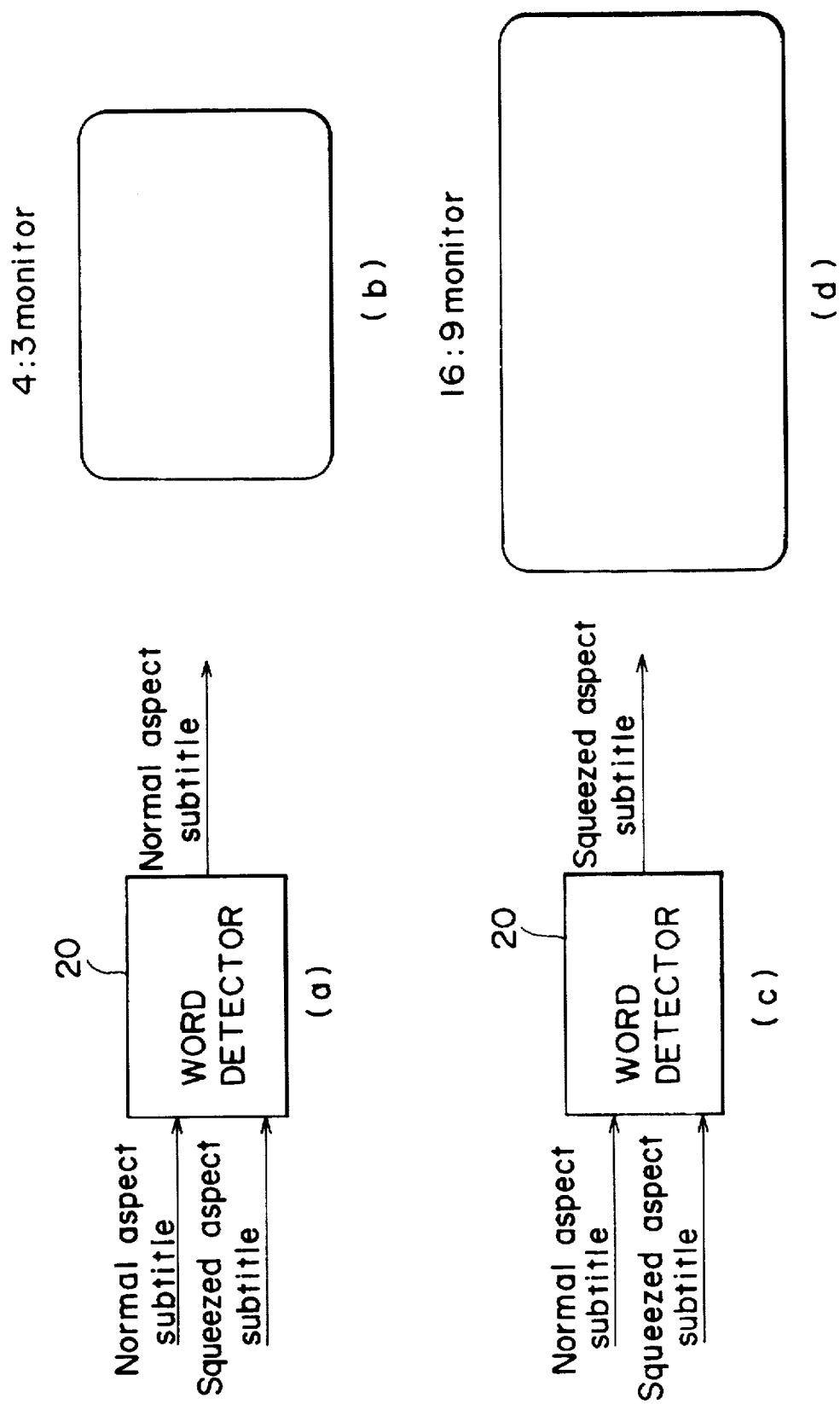
FIGS. 11a–d depict the relationship between video and subtitle data relative to an aspect ratio of a monitor.
Figure 13A:
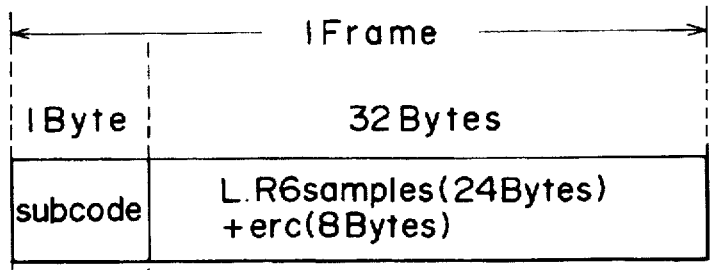
FIGS. 13a to 13c depict the arrangement of data according to a CD-G format.
Figure 13B:
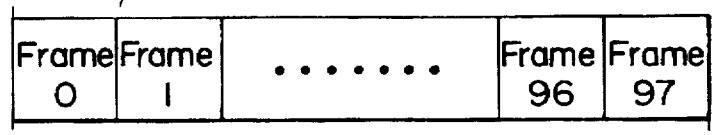
Figure 13C:
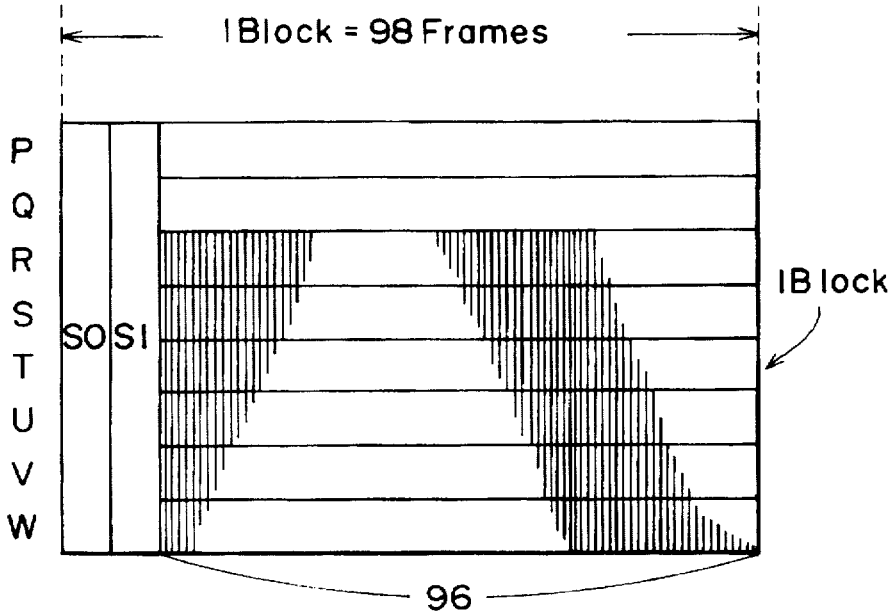
Figure 14:
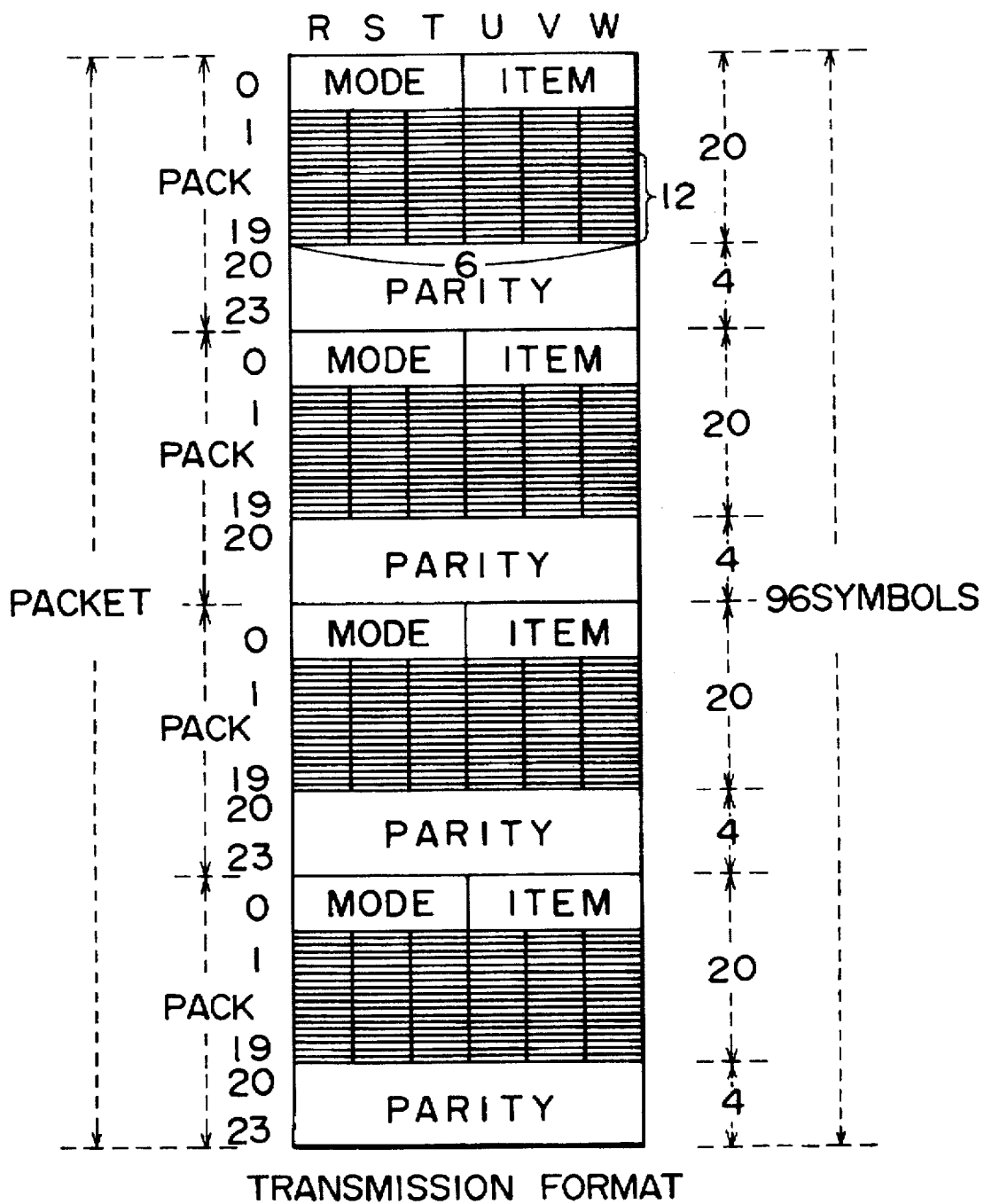
FIG. 14 depicts a transmission format of the data in the CD-G format.

The decompressed subtitle data is then sent to a 3:4 filter 25. The 3:4 filter receives an xsqueeze signal from the system controller 14 indicating the aspect ratio of the corresponding television monitor. Where the signal indicates that the monitor has a 4:3 aspect ratio, the 3:4 filter applies 3:4 filtration processing to the subtitle data to match the size of the subtitles to the size of a (16:9) video picture as shown in FIGS. 11c, d. In the preferred embodiment, the controller 35 reads 90 pixels worth of subtitle data from the code buffer 22 before the H sync pulse is generated. In the case where the television monitor already has a 16:9 aspect ratio, or the decompressed subtitle data represents fonts, the 3:4 filter is bypassed as shown in FIGS. 11a, b.

A color look-up table 26 (CLUT) (which stores luminance data Y, color difference data (Cr Cb), background video data, and key data K representing a data mixing ratio for the Y, Cr and Cb color components), receives the subtitle data from the 3:4 filter 25. FIG. 6 shows an example of a color look-up table where the components Y, Cr, Cb and K are arranged according to the addresses 0 ... F (hexadecimal). The color look-up table is employed to generate the correct color for each pixel of the subtitle characters. That is, the luminance value Y and the color difference values Cr, Cb for a particular pixel are mixed according to the ratio specified by the key data K. A mixer 34 (FIG. 2) mixes the pixel from color look-up table 26 with video data from the video decoder 3 (FIG. 1). The resulting mixed data represents a video picture with superimposed subtitles and is ready to be output to a television monitor.

Background video data is incorporated in the arrangement of the color look-up table. For example, address 0 of the look-up table includes key data K having the value of 00 H; which means that the subtitle data will not be seen and the background video data will manifest, as shown by regions T1 and T5 in FIG. 5c. Addresses 1 to 6 of the look-up table include values of the key data K which increase linearly (20, 40 ... C0 hexadecimal); which means that the subtitle pixels according to these addresses are mixed with the background data as shown by the regions T2 and T4 in FIG. 5c. Finally, addresses 8 to F of the look-up table include values of key data K of E0; which means that the components Y, Cr and Cb are mixed without any background video data as shown by region T3 in FIG. 5c. The color look-up table data is generated from the system controller and is previously downloaded to the CLUT circuit before decoding. With the color look-up table, the filtered subtitle data is transformed into the appropriate color pixel for display on the television monitor.

Another example of a color look-up table is shown in FIG. 12. The arrangement of the data and the values according to the components in this table may be used to provide color wiping. Color wiping is a display technique which "overlaps" previously displayed elements, such as subtitles, with another color usually by performing the overlay from left to right progression.

With the present invention, a viewer has control over the display of the subtitle through the mode display 9. The system controller 14, upon command from the user, sends a control signal to the mixer 34 (FIG. 2), turning the subtitles on or off. Since the present invention generates subtitles in real time, the user does not experience any unpleasant delay when turning the subtitles on or off. In addition, the subtitles can be controlled, by the user or otherwise, to fade-in/fade out at a variable rate. This is achieved by multiplying a fade coefficient to the pattern data representing the subtitles at a designated speed. This function also allows an editor of the subtitles to present viewers with different sensations according to the broadcast audio/video picture. For example, news information may be "flashed" rapidly to draw attention to the viewer, whereas subtitles in a movie might "softly" appear in order not to detract from the enjoyment of the movie.

The mixer 34 is also operable for positioning the subtitles within the video picture. This is achieved by a u_position signal sent from the system controller 14 to the mixer via controller 35 which designates the vertical direction for display on the screen. It will be noticed that the u_position value may be varied, either by a user or otherwise. This provides additional control over the position of the subtitles and a user is free to place the subtitles anywhere along a vertical axis.

The decoding apparatus of the present invention may be practiced with the parameters for the different signals shown in FIG. 4. However, the present invention is not limited to the parameters set forth in that figure and may be employed in different video systems.

Figure 9:
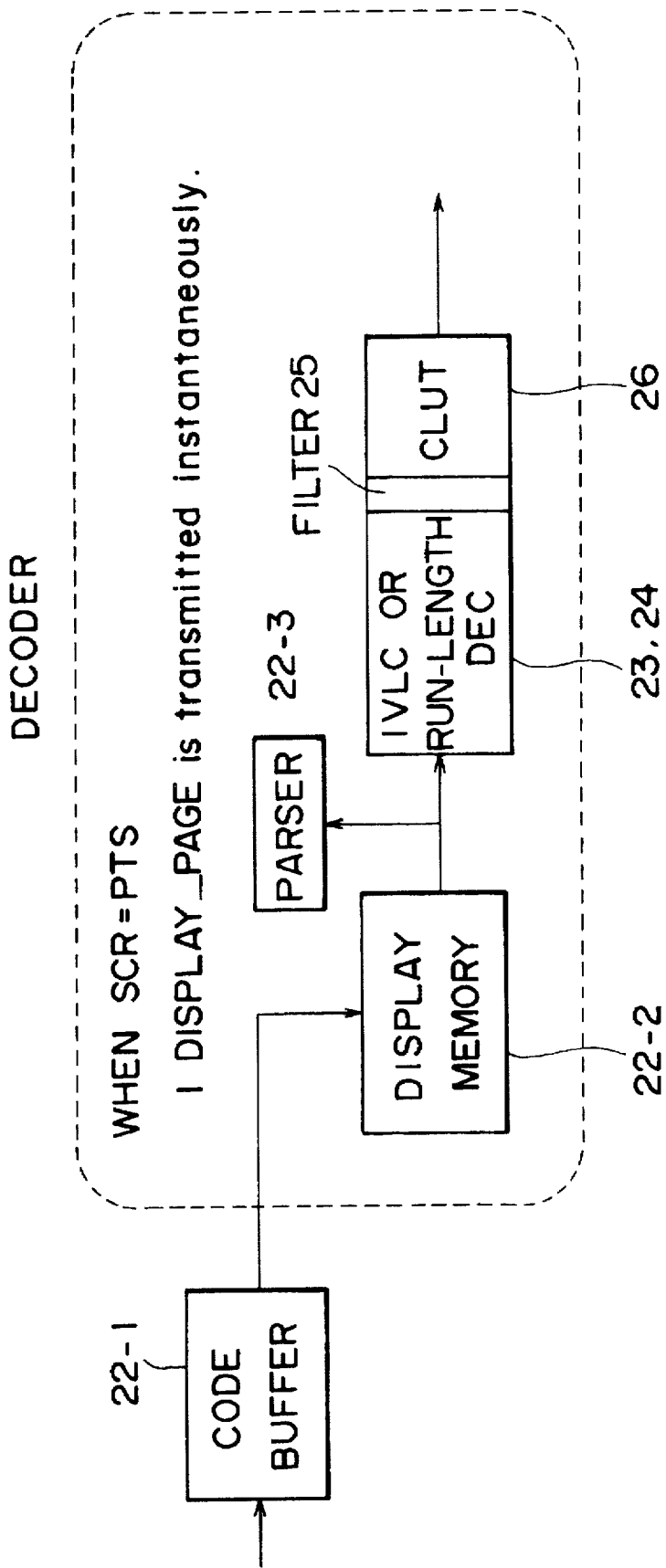
FIG. 9 is a block diagram describing the internal operation of the code buffer in FIG. 2.

In overview, the subtitle decoder 7 may be thought of as the subtitle decoder buffer model in FIG. 9. The code buffer 22-1 accumulates streams of subtitle data until at least one page of subtitle data is accumulated in the code buffer. The subtitle data for one page is transferred from the code buffer 22-1 to the display memory 22-2 (which acts as a buffer for the subtitle decoder) when the display time stamp (PTS) is aligned with the synchronizing clock (SCR). It will be noted that placing the code buffer and display memory in a single unit is preferred since the code buffer need only increment a pointer pointing to the current address in the display memory 22-2 which stores the next set of subtitle data. Thus, no delay is caused due to a transfer, resulting in a high speed transfer of the subtitle data.

Once the subtitle data for one page is transferred to the display memory 22-2, the subtitles are transferred to the IVLC or run-length decoding section 23, 24 for decoding. The headers of the bit streams are separated therefrom by a parser 22-3 and forwarded to the inverse variable-length code or run-length decoder 23,24 during a vertical blanking period (V). After decoding, the decoded subtitle data is filtered by filter 25 and color adjusted according to the color look-up table circuit 26. The streams applied to the code buffer 22-1 include subtitles for both normal and special reproduction, such as a fast-forward or fast-reverse mode. The code buffer selectively writes the streams therein according to the stream_select information supplied from the system controller 14 to select either the normal or special reproduction streams as will now be described.

Figure 10:
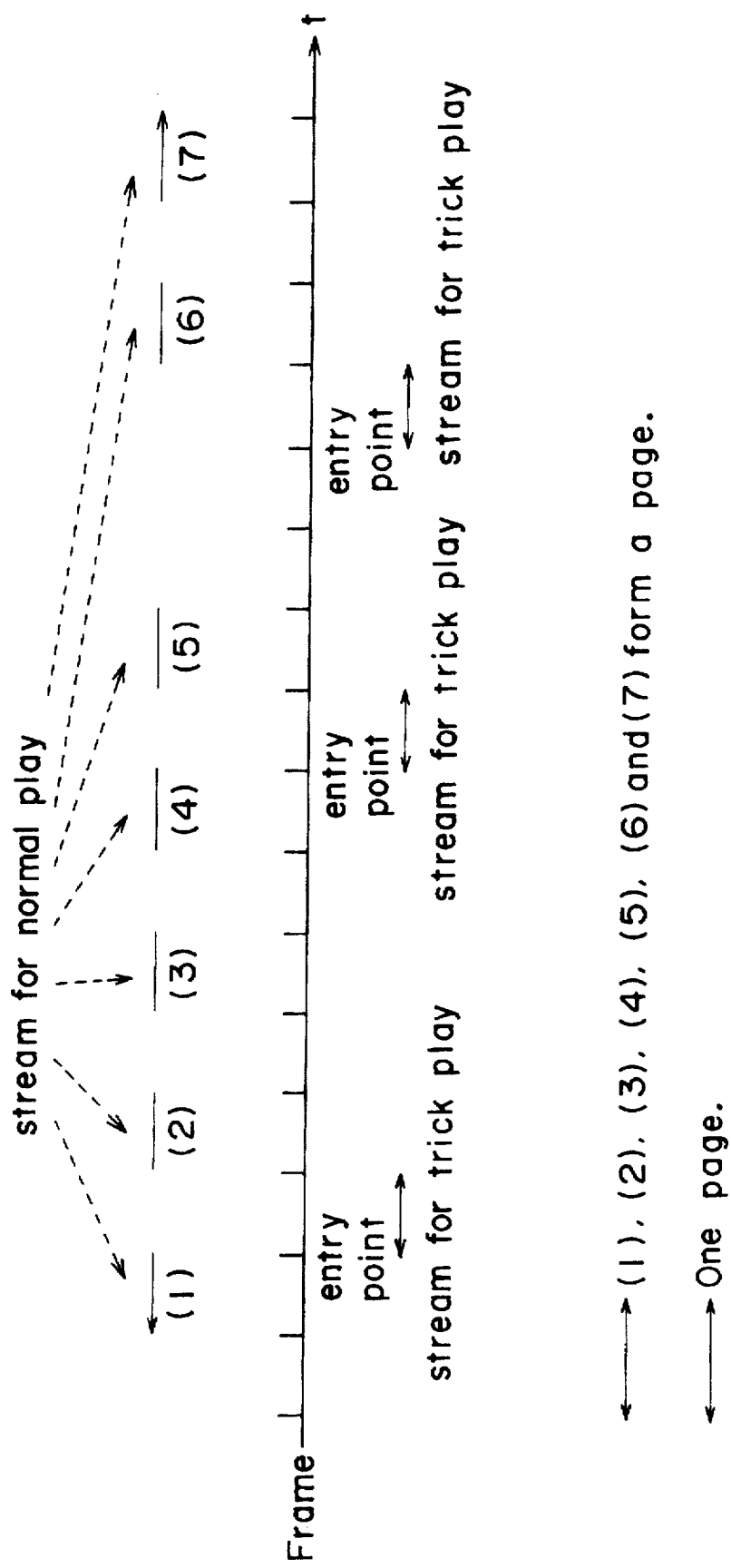
FIG. 10 is an explanatory depiction of streams of subtitle data.

FIG. 10 demonstrates the order of the streams for both normal and special reproduction. The t-axis represents the time in which a frame of subtitle streams are written into the code buffer 22. A frame includes streams which make up a page during normal play and streams that make up a page for special (or trick) play. Streams (1) through (7), for example, make up one page of subtitle data for normal play. These normal-play streams are written into the code buffer at a time along the t-axis corresponding to an "entry point". When all of the streams (1) through (7) are transferred to the code buffer, the entire page constituted by these streams is output to the display memory. The streams for special play (referred in FIG. 10 as "trick play") are staggered in-between the streams for normal play as shown in the figure. The code buffer selects between the streams of normal and special play depending upon the stream_select signal sent from the system controller 14.

This arrangement is advantageous because both pages for normal and special reproduction are applied to the code buffer at the same time. That is, the mode of the subtitle decoder 7 can be instantly changed from normal to special reproduction without lapse and the viewer experiences no lapse when subtitles are displayed in a normal mode, then, in a special mode, such as a fast-forward reproduction.

Encoding Technique

The encoding technique employed in the present invention will be described in more particular detail with reference to FIGS. 5a, 5b and 5c and FIG. 6. As an example, the technique for encoding the letter "A" of FIG. 5a will be explained. The letter "A" is scanned along successive horizontal lines and the fill data of FIG. 5b is generated for the letter "A" along each horizontal line. It will be noted that the level "E0" demarks the highest level for recreating a color pixel from the color look-up table shown in FIG. 6, whereas level "0" represents a lack of subtitle data.

The key data (K) determines the degree to which the fill data is mixed with background video. Regions T1 and T5 of the key data correspond to areas in the video picture that are not superimposed with the fill data; therefore, these areas are designated as level 0 as indicated by address 0 in FIG. 6. Regions T2 and T4 are mixed areas where the subtitles are gradually mixed with the background video picture so that the subtitles blend into the background video picture and do not sharply contrast therewith. Any of the fill data in this area is stored in addresses 1 through 6. The main portion of the letter "A" is displayed within the T3 region where the background information is muted. The subtitle information in region T3 is stored as addresses 7 to F hexadecimal. The color look-up table of FIG. 6 is arranged in varying degrees of the luminance component Y. When a pixel in the region T3 is to be stored, for example, and the level of the luminance component Y for that particular pixel is 20 (hexadecimal), address 9 is stored for that pixel. In this manner, the remaining pixels for the subtitle characters are encoded for transmission.

Encoding Apparatus

The encoding apparatus of the present invention is depicted in FIGS. 7A, B. Audio and video information is received by a microphone 53 and video camera 51, respectively and forwarded to a multiplexer 58. The subtitle data are entered through either a character generator 55 or a flying spot scanner 56 and encoded by a subtitle encoding circuit 57. The encoded subtitle information is sent to the multiplexer 58 and combined with the audio/video information onto a record disc 91 or channel for transmission, display, recording or the like.

The video camera 51 generates the video signal and supplies the same to a video encoding unit 52 which converts the video signal from analog to digital form. The digitized video signal is then compressed for video transmission and forwarded to a rate controller 52a, which controls the rate that the compressed video data is transferred to the multiplexer in synchronism with the rate that the subtitles are sent to the multiplexer. In this manner, the compressed video data is combined with the subtitle data at the correct time. Similarly, audio information is obtained by the microphone 53 and encoded by an audio encoding unit 54 before being sent to the multiplexer. The audio encoding unit does not necessarily include a rate controller because the audio data is ultimately recorded on a different track or transmitted over a different channel from the video data.

The subtitles are generated by either character generator 55 or flying spot scanner 56. The character generator includes a monitor and a keyboard which allows an operator to manually insert subtitles into a video picture. The operator edits the subtitles by typing the subtitles through the keyboard. The flying spot scanner 56 is provided in the situation where subtitles are already provided in an external video picture. The flying spot scanner scans the video picture and determines where the subtitles are positioned and extracts them from the video picture. The subtitles from the flying spot scanner are pre-processed by the processing circuit 63 to conform with subtitles generated by the character generator and forwarded to the subtitle encoding circuit.

The subtitle data from either the character generator 55 or the processing circuit 63 are then selected for compression. The character generator outputs blanking data, subtitle data and key data. The subtitle data and key data are forwarded to a switch 61 which is switched according to a predetermined timing to select either the subtitle or key data. The selected data from switch 61 is filtered by a filter 72 and supplied to another switch 62. Switch 62 switches between the blanking data, the filtered data from the character generator and the processed data from the flying spot scanner. When it is determined that no subtitles are present, the blanking data is chosen by the switch 62. Where subtitles are present, the switch 62 chooses between the character generator data or the flying spot scanner data accordingly. The selected data is then quantized by a quantization circuit 64, using a quantization based on data fed back from a subtitle buffer verifier 68. The quantized data, which may be compressed data, are supplied to a switch 69 and, during normal operation, forwarded to a differential pulse code modulation (DPCM) circuit 65 for pulse code modulation. The modulated data is run-length encoded by a run-length coding circuit 66 and variable-length encoded by a variable-length encoding circuit 67 and forwarded to the subtitle buffer verifier 68 for final processing before being sent to the multiplexer 58.

The subtitle buffer verifier 68 assembles a load block which includes the encoded subtitle data. The frame of the load block is generated by a loading block creator 70 and is referenced by the subtitle buffer verifier in assembling the data into the load block. The subtitle buffer verifier references the load block by causing switch 69 to switch from the output of the quantization circuit 64 to the output of the loading block creator 70. The loading block creator creates the load block in part with reference to the color look-up table in a color look-up table 71. For purposes of decoding, the color look-up table is forwarded directly to the subtitle buffer verifier and transferred to the multiplexer as part of the load block.

The subtitle buffer verifier 68 also prepares a header for the subtitle data which contains information indicating whether the data is to be decoded upon normal or special reproduction. Specifically, the subtitle display time (displayed duration) is determined from those signals at 90 kHz accuracy as PTS, those signals using an upper several bits and 90 kHz or those signals synchronized with the video vertical sync pulse. The header also indicates the subtitle display time as determined from the display start/termination time for the particular subtitle. The amount of information, display position, fade in information and fade out information are also stored in the header for transmission with the load block. The subtitle buffer verifier 68 also loads control information such as: normal/trick play information; position information; subtitle encoding information; time code information; and EOP information; and, an upper limit value.

The subtitle buffer verifier 68 verifies that the buffer is sufficiently filled with data without overflowing. This is done by feeding back a control signal (referred to in FIG. 7A as a filter signal) to the quantization circuit 64. The control signal changes the quantization level of the quantization circuit, thereby changing the amount of data encoded for a particular subtitle. By increasing the quantization level, the amount of data required for the subtitle data is reduced and the bit rate of data flowing to the subtitle buffer verifier is consequently reduced. When the subtitle buffer verifier determines that there is an underflow of data, the control signal decreases the quantization level and the amount of data output from the quantization circuit increases, thereby filling the subtitle buffer verifier.

The subtitles may also be controlled by color wiping. For this purpose, a wipe lever 81 is provided for an operator who operates the lever to control the color wiping of the subtitles. An adapter 82 adapts the analog signals of the wipe lever to R,G,B color data. The color data is forwarded to the loading block creator 70 to employ the color wiping look-up table in FIG. 12 instead of the normal color look-up table in FIG. 6. The operator is also provided with a monitor 84 which displays the subtitles supplied thereto by a switcher 83 as they are color wiped.

The subtitle buffer verifier 68 may be considered to be symmetrical (meaning that the encoding and decoding circuits employ the same components, but in a reverse order) with the code buffer 22 (FIG. 8). That is, the subtitle buffer verifier accumulates streams of subtitle data for at least one page of subtitles and transfers each page to display buffer 22-2 when the system clock reference (SCR) is aligned with the subtitle display time stamp (PTS). In this manner, pages of subtitle data are forwarded to the multiplexer 58 for multiplexing with the audio/video data. The multiplexed data is then recorded on an optical disc 91, or transmitted to a television receiver or recorded on other suitable media.

The present invention, thus, provides a flexible encoding/ decoding method and apparatus that encodes and decodes subtitles to be superimposed on video pictures in real time. The subtitles are also manipulated during encoding, providing a different appearance for the subtitles with different video pictures. In addition, the invention may also be employed to generate subtitle codes instead of actual text, allowing a receiving decoder to change between different languages. It will be appreciated that the present invention is applicable to other applications, such as interactive video where users can be singled out for special messages. It is, therefore, to be understood that, within the scope of the appended claims, the invention may be practiced otherwise than as specifically described herein.

We claim:

1. A subtitle data encoding apparatus for generating subtitles to be multiplexed with video pictures by a multiplexer, said apparatus comprising:

subtitle generating means for separately generating said subtitles for superimposition with a respective video picture selected from among said video pictures;

encoding means for encoding said subtitles into encoded subtitle data; and buffer means for regulating a flow rate of said encoded subtitle data to transfer said encoded subtitle data contemporaneously with said respective video picture to the multiplexer.

2. The subtitle data encoding apparatus of claim 1, wherein the encoding means comprises:

quantization means for quantizing said subtitles to produce quantized subtitle data; and coding means for compressing said subtitle data quantized by said quantization means.

3. The subtitle data encoding apparatus of claim 2, wherein the coding means comprises:

pulse code modulation means for performing pulse code modulation on the subtitle data quantized by the quantization means;

run-length coding means for performing run-length coding on the subtitle data modulated by the pulse code modulation means; and variable length coding means for variable length coding said run-length coded subtitle data.

4. The subtitle data encoding apparatus of claim 1 wherein the encoding means includes a quantizer having a quantization level and the buffer means comprises subtitle buffer verifier means for controlling said flow rate of said encoded subtitle data by controlling the quantization level of said encoding means.

5. The subtitle data encoding apparatus of claim 4 further comprising loading block creator means for creating a load block referenced by said subtitle buffer verifier means, wherein said subtitle buffer verifier means assembles headers of information into said load block and transfers the same to the multiplexer for multiplexing with said respective video picture.

6. The subtitle data encoding apparatus of claim 5 further comprising a color look-up table circuit for storing a color look-up table of color components, and wherein said loading block creator means references said color look-up table in creating said load block, and said subtitle buffer verifier means stores said color look-up table in said load block for transfer to said multiplexer.

7. The subtitle data encoding apparatus of claim 1, wherein the subtitle generating means comprises a character generator including a visual display and a keyboard for keying in said subtitles.

8. The subtitle data encoding apparatus of claim 7, wherein said substitle generating means further comprises a flying spot scanner for automatically extracting said subtitles from an external video source.

9. The subtitle data encoding apparatus of claim 6, further comprising color wiping means for performing color wiping of said subtitles.

10. The subtitle data encoding apparatus of claim 9, wherein said color wiping means performs the color wiping by replacing said color look-up table with a color look-up table having a color wiping format.

11. A subtitle data decoding apparatus for decoding encoded subtitles demultiplexed from video pictures by a demultiplexer and for superimposing said subtitles on said video pictures, said apparatus comprising:

buffer means for regulating a flow rate of said encoded subtitles to read out said encoded subtitles contemporaneously with a display of a respective video picture selected from among said video pictures;

decoding means for decoding said encoded subtitles into decoded subtitles; and mixing means for mixing said decoded subtitles with said respective video picture such that the decoded subtitles are superimposed on the display of said respective video picture.

12. The subtitle data decoding apparatus of claim 11 further comprising detector means for detecting said encoded subtitles supplied in bit streams and selectively forwarding said bit streams to said buffer means according to a reproduction mode of said subtitle data decoding apparatus.

13. The subtitle data decoding apparatus of claim 11, further comprising scheduling means for controlling read/ write access to said buffer means by setting a band width of an I/O port of said buffer means, said band width determined by dividing a rate of data demultiplexed by said demultiplexer by said flow rate of said buffer means.

14. The subtitle data decoding apparatus of claim 11, wherein said decoding means comprises:

inverse variable length coding means for decoding said encoded subtitles forwarded from said buffer means by employing inverse variable length coding; and inverse run-length coding means for decoding said subtitles from said inverse variable length coding means by performing inverse run-length coding.

15. The subtitle data decoding apparatus of claim 14 further comprising a 3:4 filter for transforming the subtitles decoded by said inverse run-length coding means into a 4:3 video picture format.

16. The subtitle data decoding apparatus of claim 11 wherein said subtitles are comprised of pixels, and further comprising color look-up table means for generating color components from a color look up table in response to said decoded subtitles, and for determining a mixing ratio for the color components of each pixel in the subtitles, wherein said mixing means mixes said color components according to said mixing ratio with said decoded subtitles.

17. A subtitle data encoding method for generating subtitles to be multiplexed with video pictures by a multiplexer, said method comprising the steps of:

generating said subtitles separately for superimposition with a respective video picture selected from among said video pictures;

encoding said subtitles into encoded subtitle data; and regulating a flow rate of said encoded subtitle data to transfer said encoded subtitle data contemporaneously with said respective video picture to the multiplexer.

18. The subtitle data encoding method of claim 17, wherein the encoding step further comprises the steps of:

quantizing said subtitles to produce quantized subtitle data; and compressing said quantized subtitle data.

19. The subtitle data encoding method of claim 18, wherein said compressing step comprises the steps of:

pulse code modulating the quantized subtitle data;

run-length coding the pulse code modulated subtitle data; and variable length coding said run-length coded subtitle data.

20. The subtitle data encoding method of claim 18 wherein said encoding step comprises controlling said flow rate of said encoded subtitle data by controlling a quantization level at which said subtitle data is quantized.

21. The subtitle data encoding method of claim 20 further comprising:

creating a load block referenced when said flow rate is controlled; and assembling headers of information into said load block and transferring the same to the multiplexer for multiplexing with said respective video picture.

22. The subtitle data encoding method of claim 21 further comprising:

storing a color look-up table of color components, referencing said color look-up table when creating said load block; and storing said color look-up table in said load block for transfer to said multiplexer.

23. The subtitle data encoding method of claim 22, further comprising color wiping said subtitles.

24. The subtitle data encoding method of claim 23, wherein said color wiping comprises replacing said color look-up table with a color look-up table having a color wiping format.

25. The subtitle data encoding method of claim 17, wherein said subtitles are generated by keying in said subtitles from a keyboard and visually displaying said keyed-in subtitles.

26. The subtitle data encoding method of claim 17, wherein said subtitles are generated by automatically extracting said subtitles from an external video source using a flying spot scanner.

27. A subtitle data decoding method for decoding encoded subtitles demultiplexed from video pictures by a demultiplexer and for superimposing said subtitles on said video pictures, said method comprising the steps of:

regulating a flow rate of said encoded subtitles to read out said encoded subtitles from a buffer contemporaneously with a display of a respective video picture selected from among said video pictures;

decoding said encoded subtitles into decoded subtitles; and mixing said decoded subtitles with said respective video picture such that the decoded subtitles are superimposed on the display of said respective video picture.

28. The subtitle data decoding method of claim 27 further comprising selectively buffering bit streams supplied to said buffer which correspond to a designated reproduction mode.

29. The subtitle data decoding method of claim 28, further comprising scheduling read/write access to said buffer by setting a band width of an I/O port of said buffer, said band width being determined by dividing a rate of data demultiplexed by said demultiplexer by said flow rate of said bit streams.

30. The subtitle data decoding method of claim 27, wherein said decoding step comprises:

inverse variable length coding said subtitles read out from said buffer; and inverse run-length coding said inverse variable length coded subtitles.

31. The subtitle data decoding method of claim 30 further comprising 3:4 filtering said inverse run-length coded subtitles into a 4:3 video picture format.

32. The subtitle data decoding method of claim 27 wherein said subtitles are comprised of pixels, and further comprising:

generating color components from a color look up table in response to said decoded subtitles;

determining a mixing ratio for the color components of each pixel in the subtitles; and mixing said color components according to said mixing ratio with said decoded subtitles.

33. A subtitle processor for processing subtitle data comprising:

bit stream select means for selecting a respective bit stream of the subtitle data from among a plurality of supplied subtitle data bit streams;

time display stamp means for indicating a time when said selected bit stream is to be decoded;

decode start means for initiating decoding of said selected bit stream at said time indicated by said time display stamp means; and mixing means for mixing said selected bit stream decoded by said decode start means with video picture data.

34. The subtitle processor for processing subtitle data according to claim 33 further comprising system reset means for resetting said subtitle processor.

35. The subtitle processor for processing subtitle data according to claim 33 further comprising channel select means for selecting a channel carrying different sets of said bit streams, each set representing a different video broadcast.

36. The subtitle processor for processing subtitle data according to claim 33 further comprising buffer clear means for dumping said respective bit stream upon detection of corrupt data.

37. The subtitle processor for processing subtitle data according to claim 33 further comprising special reproduction means for setting the subtitle processor in a special reproduction mode by causing said bit stream select means to select special reproduction bit streams from among said bit streams.

38. The subtitle processor for processing subtitle data according to claim 33 further comprising squeeze means for initiating a 4:3 conversion of a subtitle picture composed of said bit streams selected by said selected bit stream.

39. The subtitle processor for processing subtitle data according to claim 33 further comprising vertical position means for designating a vertical display position of a subtitle composed of said selected bit stream to said mixing means.

40. The subtitle processor for processing subtitle data according to claim 33 further comprising on/off means for causing said mixing means to selectively display said bit streams as a subtitle picture.

41. The subtitle processor for processing subtitle data according to claim 33 further comprising color look up table means for providing a color look up table, means for generating color components from said subtitle data making up a subtitle picture by referencing said color look up table.

* * * * *